United States Patent
Myhill et al.

(10) Patent No.: US 8,366,272 B1
(45) Date of Patent: Feb. 5, 2013

(54) FITTING CONTACT LENSES FOR IRREGULAR CORNEAS

(75) Inventors: Joan Christine Myhill, Newmarket (GB); Lynn White, Leighton Buzzard (GB)

(73) Assignee: Contact Lens Precision Laboratories Limited, Leighton Buzzard, Bedfordshire (GB)

( * ) Notice: Subject to any disclaimer, the term of this patent is extended or adjusted under 35 U.S.C. 154(b) by 54 days.

(21) Appl. No.: 13/213,179

(22) Filed: Aug. 19, 2011

(51) Int. Cl.
*A61B 3/00* (2006.01)
*A61B 3/10* (2006.01)

(52) U.S. Cl. ........................ 351/219; 351/212
(58) Field of Classification Search ........... 351/200–246
See application file for complete search history.

(56) References Cited

U.S. PATENT DOCUMENTS

| | | | |
|---|---|---|---|
| 7,244,026 B1 * | 7/2007 | Ross et al. | 351/219 |
| 2002/0149745 A1 * | 10/2002 | Fukuma et al. | 351/219 |
| 2011/0025979 A1 * | 2/2011 | Chehab et al. | 351/212 |

* cited by examiner

*Primary Examiner* — Mohammed Hasan
(74) *Attorney, Agent, or Firm* — Barnes & Thornburg LLP (57) ABSTRACT

Disclosed is a method of determining an appropriately shaped soft contact lens for a subject with an irregular cornea, the method comprising the steps of: inferring or deducing the profile of the cornea over at least a portion thereof: selecting a first choice fitting lens, the selection being based on the profile of the cornea obtained in the preceding step; assessing the fit of the contact lens to the cornea, by investigating each of the following parameters; (i) translational movement of the lens on eye; (ii) rotation of the lens on eye; (iii) centration of the lens on eye; (iv) the perceived comfort of the lens for the subject; (v) the visual acuity of the subject when wearing the lens; and adjusting the choice of fitting lens, if required, according to the assessment and reiterating until a desired fit of lens to the cornea has been obtained.

17 Claims, 7 Drawing Sheets

Corneal Profile Chart

| Natural Ectasias | Topography | Normal | Mild | Moderate | Advanced |
|---|---|---|---|---|---|
| Central Keratoconus Steep Periphery | | | | | |
| Central Keratoconus Flat Periphery | | | | | |
| Decentred/ Low Keratoconus | | | | | |
| Pellucid Marginal Degeneration | | | | | |
| Post Surgical | | | | | |
| Post Surgical | | Post surgical corneas are often reverse geometry in shape but this is by no means a general rule. | | | |

FIG. 3

| BCOR | DIA | PERIPH | Power |
|---|---|---|---|
| 7.80mm | 14.50mm | STD | Plano |
| 8.00mm | 14.50mm | STD | Plano |
| 8.20mm | 14.50mm | STD | Plano |
| 8.40mm | 14.50mm | STD | Plano |
| 8.60mm | 14.50mm | STD | Plano |
| 8.80mm | 14.50mm | STD | Plano |
| 8.20mm | 14.50mm | FLT2 | Plano |
| 8.60mm | 14.50mm | STP2 | Plano |

FIG. 4

| Condition | Topography | Corneal Profile | MILD | MODERATE | ADVANCED | Hints and Tips |
|---|---|---|---|---|---|---|
| Central Keratoconus Steep Periphery | | | 8.60:14.50:STD | 8.40:14.50:STD | 8.00:14.50:STD | 7.60 BC and 7.40 BC are also available on request but should only be necessary in very advanced cases. Due to the corneal shape, STP1 peripheries may also be required in some cases. |
| Central Keratoconus Flat Periphery | | | 8.60:14.50:STD | 8.20:14.50:FLT2 | 8.00:14.50:FLT2 (Not in Fitting Set) | Mild, moderate and advanced cases may all require FLT periphery fitting lenses with the appropriate base curves. |
| Decentred/ Low Cone | | | 8.60:14.50:STD | 8.40:14.50:STD | 8.20:14.50:STD | In cases where all fitting lenses persist in dropping significantly, it may be necessary to use SMC, steepening lenses in the inferior sector only. |
| Pellucid Marginal Degeneration | | | 8.60:14.50:STD | 8.40:14.50:STD | May require SMC | In advanced cases the SMC design that is applied will usually require a superior FLT sector and inferior STP sector to reflect that these corneas are rotationally non-symmetrical. |
| Post Surgical | | | 8.60:14.50:STP2 | | | In post surgical cases, if there is limited information as to the corneal shape, begin with the 8.60:14.50: STD lens. These types of corneas may require STP periphery fitting lenses with the appropriate base curves. Tilted grafts or post reflective surgery ectasias may require an SMC design. |

FIG. 5

Fit Assessment Guide

Asses initial fitting lens within first 5 minutes to assess if the fit is in the RED zone. If so, remove and reassess fit.

| If the fit is in the GREEN or AMBER zone, begin over refraction while lens is settling | ⇨ | If VA is in AMBER zone, determine weather fit is tight or flat and then adjust by 1 step | ⇨ | Once an optimal fit is found, allow the lens to settle further for 15-20 minutes. Recheck for any rotation changes and stability of VA before ordering. Finalise over refraction and take note of BVD. |

| | | Optimal Fit (Green) | Re-assess Fit (Amber) | Incorrect Fit (Red) |
|---|---|---|---|---|
| Mo | ⇕ | Up to 2mm Vertical post blink | <0.50mm or >2mm | Too mobile OR immobile lens that moves with push-up |
| | | Up to 2mm acceptable if patient is comfortable | <0.50mm - Try one step flatter >2mm - Try one step steeper | If lens too flat - try 2 steps steeper if lens too tight - try 2 steps flatter |
| Ro | ↺ | NO ROTATION Laser mark vertical | Reassess if up to 15 degrees | >15 degrees |
| | | Up to 10 degrees rotation acceptable if fitting 1 step steeper or flatter does not reduce the angle | Unstable rotation on blink - flat fit stable rotation on blink - tight fit | Unstable rotation on blink - flat fit stable rotation on blink - tight fit |
| C | ⊙ | CENTRED | DECENTRED or FOZ drops to limbus on upward gaze | FOZ drops below limbus on upward gaze |
| | | Minimal decentration acceptable if visual acuity is good | Try lens 1 step steeper | Try lens at least 1 step steeper |
| Co | | COMFORTABLE | DISCOMFORT | UNCOMFORTABLE |
| | | Consistently good comfort | Lens feels edgy - flat fit discomfort in one location - tight fit | Comfort does not improve with time |
| VA | | STABLE | FLUCTUATION ON BLINKING | VERY POOR VISION |
| | | Visual acuity should not fluctuate on blink | Worse after blink - flat fit clearer after blink - tight fit | Poor visual acuity is not improved by any over-refraction |

FITTING CONTACT LENSES FOR IRREGULAR CORNEAS

FIELD OF THE INVENTION

This invention relates to a method of fitting a soft contact lens for a subject with an irregular cornea.

BACKGROUND OF THE INVENTION

In most human subjects, the surface of the cornea is a good approximation to a portion of a sphere. However, in some subjects the cornea deviates substantially from the ideal sphere and such corneas are said to be irregular. Irregular corneas may be a result of surgery or grafting, or may arise from natural ectasia (a thinning of the cornea that results in some areas being steeper than others), such as in keratoconus, which affects at least 1 in 2000 of the population.

Subjects with irregular shaped corneas will suffer impaired vision due to the irregular astigmatism and optical aberrations arising from the corneal distortion, quite apart from any other vision defects they may also have. Traditionally, such visual defects in subjects with irregular corneas have been corrected, or at least ameliorated, using rigid contact lenses which act as a replacement, regular corneal shape.

Fitting rigid contact lenses for subjects with irregular corneas can be greatly facilitated by the conventional technique of instilling a fluorescent orange dye (fluorescein) into the eye. The dye fluoresces green when exposed to blue light. The dye is taken up by the tear layer and so, under suitable illumination, the tears appear green in areas where they pool (e.g. in places where the contact lens does not fit in alignment with the surface of the cornea) and are a dark purple colour where the tear layer is restricted (e.g. where the contact lens is in contact with the corneal surface).

Whilst the use of rigid lenses is still the more common practice, in recent years, soft contact lenses have been used to correct vision defects in subject with irregular corneas. Soft contact lenses are typically made from hydrogels and have a high water content and higher oxygen permeability compared to rigid lenses. Accordingly they are more comfortable to wear. However, it is not possible to use the fluorescein technique to assist in fitting soft contact lenses because, inter alia, soft contact lenses drape more to the corneal shape resulting in a uniform tear film. Due to fluid take up of soft lenses, high molecular weight fluorescein derivatives have to be used with these lenses but even so, very little information as to fit can be deduced from the appearance of the fluorescing tear film. Accordingly, there is a high degree of skill required to ensure a soft contact lens achieves a good fit on an irregular cornea, and a significant amount of trial and error is required. It is an object of the present invention to provide an improved method of fitting a soft contact lens for a subject with an irregular cornea. In particular the method aims to optimise the efficiency of the fitting process by reducing the number of test fitting lenses required to be used and/or to reduce the amount of practitioner time to complete the fitting process.

SUMMARY OF THE INVENTION

In a first aspect the invention provides a method of determining an appropriately shaped soft contact lens for a subject with an irregular cornea, the method comprising the steps of:
(a) inferring or deducing the profile of the cornea, using information obtained from at least one analytical technique, which information allows inferences or deductions to be made regarding the corneal profile over at least a portion thereof:
(b) selecting a first choice fitting lens, the selection being based on the profile of the cornea obtained in step (a), and placing the selected lens on the subject's cornea;
(c) assessing the fit of the contact lens to the cornea, by investigating each of the following parameters;
  (i) translational movement of the lens on eye;
  (ii) rotation of the lens on eye;
  (iii) centration of the lens on eye;
  (iv) the perceived comfort of the lens for the subject;
  (v) the visual acuity of the subject when wearing the lens; and
(d) adjusting the fitting lens, if required, according to the assessment performed in step (c) and reiterating the step (c) assessment using the adjusted fitting lens until a desired fit of lens to the cornea has been obtained; and, optionally,
(e) adjusting the periphery of the lens to obtain a desired fit to the cornea at the periphery thereof.

In the fitting method of the invention, step (a) of inferring or deducing the profile of the cornea can use any analytical technique which allows inferences or deductions to be made regarding the profile of the subject's cornea over at least a portion thereof. By way of explanation, that part of the cornea which is involved in vision is essentially restricted to a circular central portion, about 8 mm in diameter, which overlies the pupil. The method of the invention will preferably allow inferences or deductions to be made regarding not only the central portion of the corneal profile but also at least some of the periphery of the cornea as well (i.e. that portion lying outside the central 8 mm diameter circle).

Figure 2:
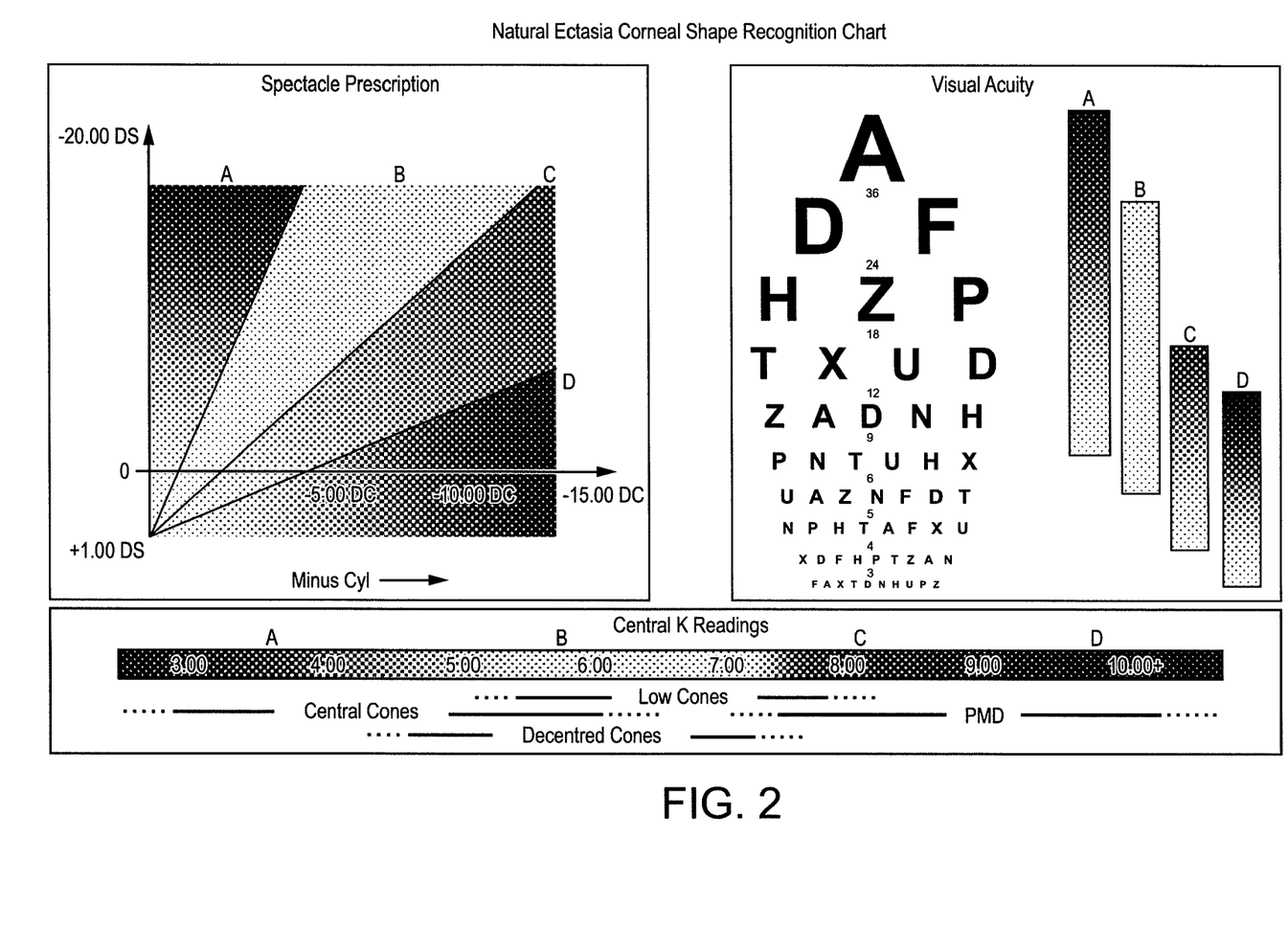
FIG. 2 shows a "Natural Ectasia Corneal Shape Recognition Chart" devised by the applicants for use in performing the method of the invention, to assist practitioners in inferring a corneal profile for a subject.

Techniques used to determine the corneal profile may include corneal topographical analysis using a corneal topographer instrument and/or examination of the subject using a slit lamp to assess the corneal profile (preferably in the vertical meridian). Another technique that may be used, either in isolation or in combination with one or both of the aforementioned techniques, is a measurement or estimation of the radius of curvature of the central portion of the cornea (known to those skilled in the art as "Central K readings"). Central K readings may, in particular, be used in combination with knowledge of the subject's existing spectacle prescription (for the eye in question) and measurement of the subject's visual acuity (again, for the eye in question) to characterise, to some extent, the subject's corneal profile. This relationship is valid only for naturally occurring ectasia. The applicants have devised a chart to assist practitioners in performing this partial characterisation, based on the combination of existing spectacle prescription, visual acuity, and central K reading. The chart is shown in FIG. 2.

The subject's existing spectacle prescription can be checked from the subject's records. The subject's visual acuity can also be checked from existing records if a visual acuity test was performed recently.

Alternatively a standard visual acuity test (e.g. using a Snellen chart) may be performed as part of the method of the invention. Such tests are well known to those skilled in the art.

The step (a) of inferring or deducing the profile of at least a portion of the cornea, conveniently includes, as a subroutine, partial characterisation of the corneal profile, which characterisation can be used to facilitate step (b), the selection of the first choice of test fitting lens.

The partial characterisation advantageously takes the form of, or includes, allocating the corneal profile to one of a plurality of pre-determined profiles. The number of pre-determined profiles will generally be between 3 (inclusive) and 6 (inclusive). The applicants have developed a method which recognises four corneal profiles for natural ectasias, and one profile for post-surgical/grafting corneas. The four profiles for natural ectasias used by the applicants are: (i) central keratoconus, steep periphery; (ii) central keratoconus, flat periphery; (iii) decentred keratoconus (i.e. where the cornea bulges off-centre); and (iv) pellucid marginal degeneration (PMD). Where the profile is of a decentred keratoconus, the keratoconus is usually below the central axis, but in some cases the keratoconus may be above the axis; or may be laterally-offset to the left or right).

Figure 3:
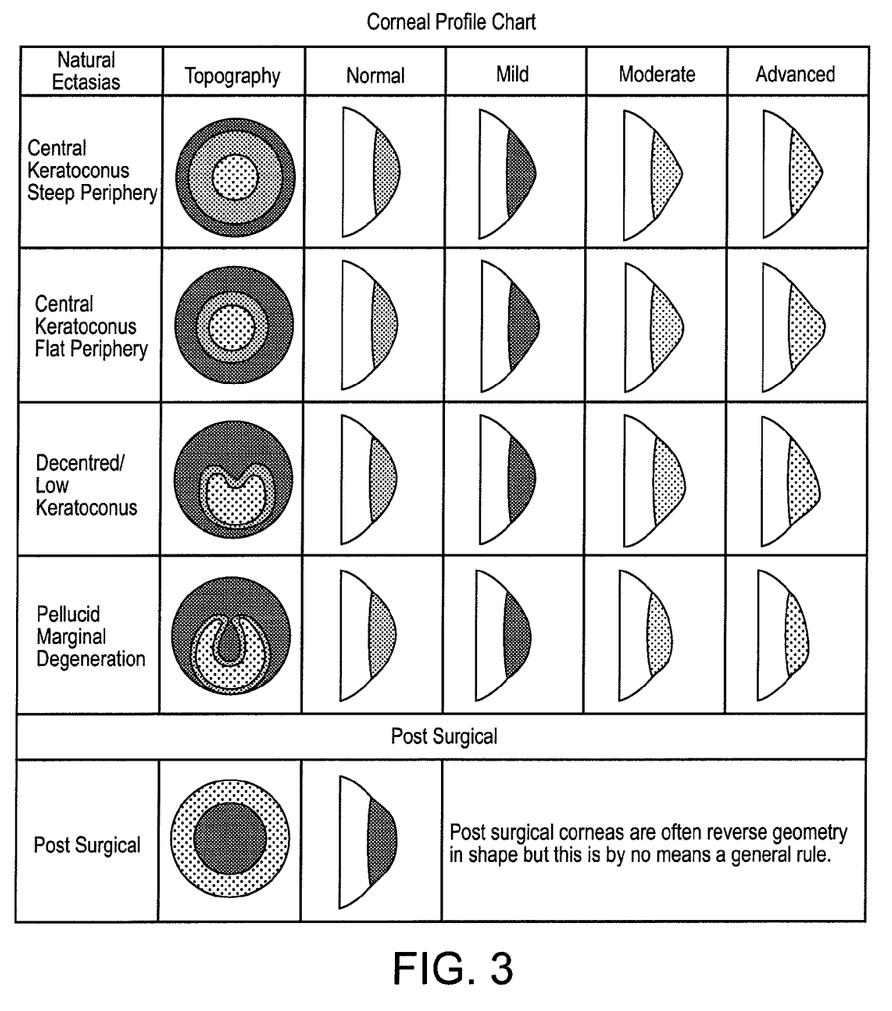
FIG. 3 shows a Corneal Profile Chart devised by the applicants for use in performing the method of the invention, to assist practitioners in allocating a subject's corneal profile to one of a particular predetermined type of profiles, primarily based on corneal shape as determined by examination using a slit lamp instrument, but optionally based on additional or alternative analytic techniques.

The applicants have devised a "Corneal Profile Chart" for use in the method of the invention to assist practitioners in allocating the corneal profile of the subject to one of the pre-determined groups. The chart is illustrated in FIG. 3.

Based on the influences or deductions made in performing step (a), and preferably having allocated the subject's corneal profile to a selected one of a plurality of predetermined profiles, the person performing the method proceeds to step (b) i.e. selects a first test fitting contact lens to put on the subject's eye. Conveniently, the practitioner will already be provided with a plurality of test fitting soft contact lenses. For example, the applicants prefer to use a set of eight test fitting lenses. All the test lenses in the set have a diameter of 14.50 mm and are plano lenses (i.e. have a zero optical power). The lenses have a different respective radius of curvature over the central portion of their back or rear surface (i.e. that surface which contacts the cornea when the lens is worn on the eye). Most of the lenses in the test set have a 'standard' (i.e. spherical) curve applied to the periphery of the back surface, but one or more lenses may advantageously have a flatter peripheral back surface (i.e. with a radius of curvature larger than that of the central portion), and one or more lenses in the testing kit may advantageously have a steeper peripheral back surface (i.e. with a radius of curvature smaller than that of the central portion).

The method of the invention increases the chance that the practitioner will select the test fitting lens, typically from a pre-supplied test lens kit, most appropriate to the corneal profile of the subject, and thus achieve the best fit as efficiently as possible and, if this is not achieved with the first lens, will tend to reduce the amount of trial and error required to identify an appropriately-fitting lens.

Having selected the first fitting lens, the practitioner applies the lens to the subject's cornea. Conventionally, at this point, the practitioner would normally leave the lens in ocula for at least 15 minutes before attempting to assess the fit of the lens, because it takes this amount of time for the natural "tear reflex" to subside, the tear reflex causing the subject to produce relatively large amounts of tear fluid, which makes it difficult to assess the fit of the lens. In contrast, in the method of the present invention, it is highly desirable that the step (c) of assessing the fit of the lens is initiated within about 5 minutes, preferably within 4 minutes, more preferably within 3 minutes, and most preferably within 2 minutes of placing the test lens on the subject's cornea. This is because, with the soft contact lens as used in the invention, the lens will naturally start to "drape" on the cornea within about 5 minutes. This draping can cause indicators of mis-fitting (such as bubbles in the tear fluid, or lens edge lifting) to disappear, thus these indicators may not be observed unless the fit assessment is commenced within at least 5 minutes of the test as having been placed on the subject's cornea.

The test lens fit assessment is performed in step (c) by analysis of several parameters. The applicants use the acronym "MoRoCCo" to describe the fit assessment process, the acronym standing for "Movement", "Rotation", "Centration" and "Comfort", which are four of the five parameters assessed in step (c) of the method. The fifth parameter assessed is visual acuity (VA).

The five parameters are preferably all given equal or approximately equal weighting. In addition, the five parameters are all conveniently assessed at substantially the same time (e.g. within about 6 minutes, preferably within about 5 minutes, more preferably within about 4 minutes, of each other).

Advantageously the assessment of movement, rotation and centration can all be done substantially simultaneously by examining the behaviour of the test lens on the subject's eye, using a slit lamp instrument. Movement and rotation of the lens should conveniently be assessed by examining the position of the lens before and after blinking. In addition, it is a preferred feature that movement, rotation and centration of the lens should be assessed using a Dynamic Assessment Routine ("DAR"), in which at least parameters (i)-(iv) are investigated with the subject (1) looking straight ahead; (2) gazing upward; and (3) looking to right and to left.

The comfort of the lens can be assessed by asking the subject to indicate if the test lens is comfortable or uncomfortable. If desired the subject can be asked to allocate the lens a 'comfort score' e.g. on a scale from 1 to 5, with 1 being extremely uncomfortable, and 5 being very comfortable.

Visual acuity can be tested in an entirely conventional manner, and conveniently the acuity should be retested after the subject blinks.

Testing each of these five parameters (MoRoCCo and VA), the practitioner can ascertain if the test lens is a good fit for the subject's cornea. If each of the five parameters yields an acceptable result, then no further testing is required and a suitable contact lens can be ordered (together with a suitable over-refraction, based on the subject's existing prescription, if known, to correct any refractive vision defects).

More typically, at least one parameter may yield an unacceptably poor result, requiring adjustment of the test lens. This will usually be done by selecting a different, second, test lens from a supplied kit of test lenses, the second test lens having at least one different shape characteristic relative to the first test lens, e.g. a steeper or flatter back curve over a central and/or a peripheral portion of the contact lens.

In a preferred embodiment, the kit of test fitting lenses will comprise a series of similar lenses in which the radius of curvature of the back surface of the lens varies by fixed increments between adjacent lenses in the kit. The current applicants have found that an increment of 0.2 mm in the radius of curvature of the back surface is suitable, the test kit comprising lenses having a radius of curvature of the back surface ranging from about 7.6 mm or 7.8 mm to about 8.8 mm, in 0.2 mm increments.

The assessment of the fit of the second test lens is performed as described previously in relation to the first test lens. Importantly, as before, the assessment is performed within 5 minutes, preferably within 4 minutes, more preferably within 3 minutes, and most preferably within 2 minutes, of placing the second test lens on the subject's cornea. Again, the MoRoCCoNA assessment is performed, testing all five parameters, although when testing the second and/or subsequent test fitting lenses, the test of visual acuity may optionally be dispensed with, since the acuity will often be unchanged from that obtained with the first test lens, although visual acuity remains an important fit indicator, and should preferably therefore be re-checked for second and/or subsequent lenses.

The adjustment of the test fitting lens and assessment of the fit thereof may be repeated as many times as necessary to reach an acceptable fit of the lens. Usually only one or two test lenses are required for any one subject, but three, four or more could be used in especially difficult circumstances.

If desired, the test fitting lenses can be discarded after use on one subject, to avoid the risk of spreading infection (especially vCJD). Alternatively the test fitting lenses can be re-used after being subjected to appropriate sterilisation procedures (e.g. autoclaving, or immersion in aqueous hydrogen peroxide solutions) known to those skilled in the art.

An optional fifth step of the method of the invention involves adjusting the curvature of the periphery of the back surface of the lens (i.e. that portion outside the central 8 mm diameter circle) to improve the fit of the lens to the periphery of the cornea. Typically this involves selecting a curvature for the periphery which is steeper or flatter (i.e. has a smaller or larger radius of curvature) than the curve of the back surface of the lens in the central portion. In simple cases, a single radius of curvature will be applied to the whole of the back surface of the periphery of the lens. In other instances the subject may have a more irregular shape for the periphery of the cornea, and in those instances, different radii of curvature may be applied to different sectors of the peripheral portion of the lens. Advantageously there is a smoothing applied to the interface between sectors with different radii of curvature, such that adjacent sectors merge or blend into one another without a sharp discontinuity, which might make the lens uncomfortable. Desirably there is at least 30° of angular separation between neighbouring sectors with different radii of curvature, which separation is required to allow a smooth blending between the two sectors. As many different sectors may be applied to the periphery of the lens as is deemed necessary to achieve an acceptable fit. Typically there may be between two and twenty sectors, more usually between two and ten. The applicants describe this feature of the invention as Sector Management Control ("SMC").

Once the desired curvature(s) for the periphery of the lens has been ascertained, a contact lens can be manufactured according to the required characteristics, and incorporating any over-refraction needed to correct refractive vision defects in the subject.

In a second aspect, the invention provides a method of making a soft contact lens for a subject, the method comprising the steps of: determining an appropriate shape for at least the rear surface of the contact lens for the subject, using the method of the first aspect of the invention defined above; and causing a contact lens to be manufactured with the determined shape.

It will be apparent that the actual manufacture of the lens may be performed by a party other than the practitioner who determined the appropriate shape which the lens should have. For example, a practitioner may determine the appropriate shape for the contact lens and then provide instructions to a lens manufacturer for the relevant lens to be made.

In a third aspect, the invention provides a kit for use in the method of the first aspect of the invention, the kit comprising: a set of test soft contact lenses, the set comprising a plurality of lenses each having a different respective radius of curvature over the central portion of their rear surface; and a fit assessment guide, providing information on how to perform the method of the first aspect of the invention.

The set of test lenses will typically comprise a plurality of plano lenses having zero optical power. Conveniently the set of test lenses will comprise a plurality of lenses having the same diameter (typically about 14.50 mm). In some embodiments one or more of the lenses may have a peripheral back surface which is more steeply curved than most of the test lenses in the set, and one or more of the lenses may have a peripheral back surface which is flatter (i.e. has a greater radius of curvature) than most of the test lenses in the set.

The fit assessment guide may take any suitable form for presenting information or guidance. For example, the guide may be in the form of printed information such as a wall chart or booklet, or a CD-ROM or DVD, or an online tutorial accessed via the Internet.

The invention will now be more particularly described by way of illustrative example and with reference to the accompanying drawings.

BRIEF DESCRIPTION OF THE DRAWINGS

FIG. 6 shows a "Fit Assessment Guide" chart devised by the applicants for use in performing the method of the invention;

EXAMPLES

The applicants have devised a method of designing a soft contact lens for fitting to an irregular-shaped cornea. The method seeks to minimise the amount of practitioner time required to determine the correct fit for the lens and thus improve efficiency. The method is especially suitable for use with soft contact lenses sold under the trade name Kerasoft IC (Kerasoft is a registered trade mark of Bausch & Lomb, Inc.).

The KeraSoft® IC soft contact lens is designed to fit all stages of keratoconus and other irregular cornea types e.g. PMD, post-graft and post-refractive surgery. The lens is available in a choice of 2 materials; lathe cut Silicone Hydrogel (SiH) (74% water content) and high water content Hydrogel (77% water content).

The KeraSoft® IC has a front surface toric design, with a front optic zone diameter of 8 mm. The spherical back surface has tricurve geometry with a large back optic diameter of 12.50 mm for the standard 14.50 mm diameter lens. A wide range of base curves and diameters are available (see below).

The periphery of the lens can be manipulated independently of the base curve. Additionally, if required, the periphery can be altered in one or two sectors only, the size and angles of which can be defined by the practitioner (Sector Management Control).

Each lens has a vertical laser mark at the 6 o'clock position; a full line indicates the lens is for the right eye and a broken line indicates the left. Additionally, there is a dot (the inversion mark) located to the right of the laser mark (when looking at the lens from the front surface) and this allows the practitioner to ensure the lens is not inside out.

Stabilisation is achieved using prism ballast with balanced overall thickness. All Fitting Lenses are prism ballasted to ensure that they fit in the same way as the final powered lens.

The KeraSoft® IC lens is available over the following range of parameters:

| | |
|---|---|
| Base Curve | 7.40 mm to 9.40 mm (0.20 mm increments) |
| Diameter | 14.00 mm to 15.50 mm (0.50 mm increments) |
| Lens Design | Front surface Asphere or Aspheric Toric prism Ballasted with balanced overall thickness Wavefront aberration control |
| Periphery Options | Standard, STEEP1, STEEP2*, STEEP3*, STEEP4* (*Reverse Geometry), FLAT1, FLAT2, FLAT3, FLAT4 |
| Sector Management Control | Periphery can be individually customised to allow Steeper and Flatter sectors, with a continuous blend between the two sectors |
| Power Range | Sphere: +30.00 DS to −30.00 DS Cylinder: −0.50 to −15.00 DC (in 0.25 increments) Axis: 1° to 180° (in 1° increments) |

An essential feature of the method of the invention is the observation of the behaviour of a test fitting lens on the eye. The method includes, in particular, observation of Movement, Rotation, Centration and Comfort (for which the applicants have devised the acronym MoRoCCo) and visual acuity (VA).

These parameters are related to one another and are given substantially equal importance when assessing the fit of the lens on an irregular cornea. If only two or three of the MoRoCCo characteristics are optimal when assessing a fitting lens, it is less likely that the final corrective lens will behave as desired.

Importantly, the behaviour of the test lens should be observed within 10 minutes, preferably within 8 minutes, more preferably within 6 minutes, and most preferably within 5 minutes of having been placed on the subject's eye.

Movement Lathe-cut KeraSoft® IC lenses naturally move a good deal more than disposable lenses, and up to 3 mm post blink movement is acceptable.

Rotation Rotation of the KeraSoft® IC is a strong indicator that the fit is not correct, unlike normal toric lenses, where rotation can easily be accounted for by changing the cylinder axis.

Centration The centration of the lens can be easily determined by observing the Front Optic Zone and is a very useful indicator in assessing flat fits.

Comfort KeraSoft® IC lenses should be comfortable. General discomfort can indicate the lens is flat and discomfort in one position indicates the lens is tight at that point.

VA It is important that visual acuity is assessed before and after the blink. If VA clearer after the blink, this indicates a tight fit and if VA is worse after the blink, that indicates a flat lens.

The method of the invention comprises, in general terms, the steps of (a) identifying a corneal profile group, over at least a portion of the cornea, for the irregular cornea in question (b) from step (a) identifying an appropriate first choice test fitting lens, typically from a pre-existing kit of a selected plurality of different test fitting lenses; (c) assessing the fit of the lens on the cornea, using the MoRoCCo and VA parameters; (d) if necessary, adjusting the test fitting lens, typically by selecting a different test lens from the kit and re-assessing the fit; and, optionally, (e) determining an appropriate shape for the periphery of the rear surface of the lens.

Figure 1:
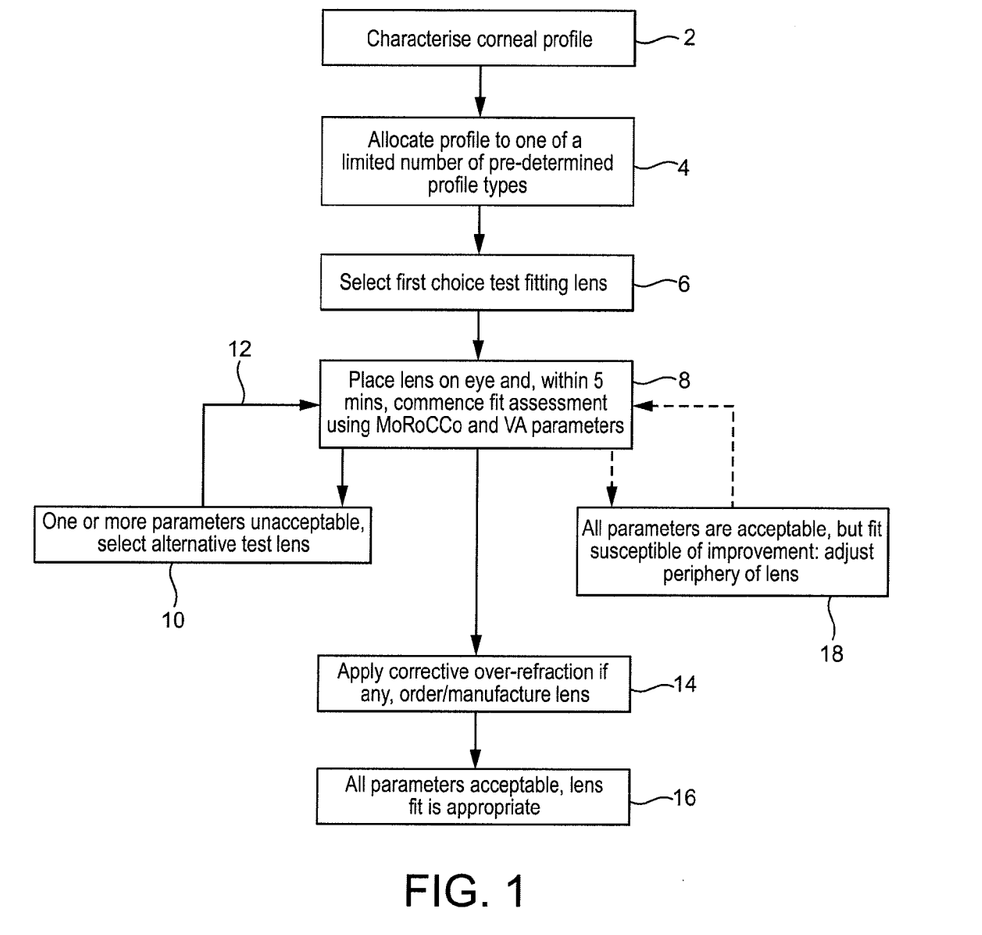
FIG. 1 shows a flow chart schematically illustrating the steps performed in one embodiment of the method of the invention.

Referring to FIG. 1, in one embodiment the method of the invention involves, as a first step (2) obtaining information about the profile of the subject's cornea, and using this to characterise the corneal profile. The information used to characterise the profile may preferably be obtained by means of a corneal topographer instrument and/or by means The method of the invention will be further illustrated by way of selected anonymous case studies below.

Referring to FIG. 1, in one embodiment the method of the invention involves, as a first step (2), obtaining information about the profile of the subject's cornea, and using this to characterise the corneal profile. The information used to characterise the profile may preferably be obtained by means of a corneal topographer instrument and/or by means of a slit lamp instrument to examine the median vertical profile of the cornea. The information used to characterise the corneal profile, at least in the case of a natural ectasia (i.e. are not due to corneal surgery or grafting), may comprise a pre-existing spectacle prescription, visual acuity test and central K reading. This information can be used, in the case of natural ectasias, to infer corneal profiles e.g. using a chart as illustrated in FIG. 2. In some embodiments, two, three or more of the aforementioned information sources are employed.

Referring to FIG. 2, the "Natural Ectasia Corneal Shape Recognition Chart" comprises three components. There is a graph for existing spectacle prescription, which divides the subject's prescription into four general areas, A-D. There is a diagram for the subject's visual acuity, in which the subject's visual acuity (as assessed using a Snellen Chart) is related to the spectacle prescription areas A-D (e.g. prescription area A generally has the worst acuity, with areas B-D generally displaying a progressive improvement in acuity). Finally, at the bottom of the chart is a diagram relating the four areas A-D of spectacle prescription to "central K readings" (i.e. the radius of curvature measured for the central part of the subject's cornea, in mm), which in turn suggests a possible group or groups to which the corneal profile might be allocated ("Low Cones", "Central Cones", "Decentred Cones" or "PMD").

The relationship between spectacle refraction, visual acuity and central K readings is influenced by the location of the steepest area of the cornea. Note that this relationship does not apply to post-surgical corneas, as they no longer have a natural shape. The chart shown in FIG. 2 should not therefore be used in those circumstances.

Once the corneal profile has been characterised, it is allocated (4 in FIG. 1) to one of a pre-determined limited number of corneal profile types. This can be done, for example, by reference to a Corneal Profile Chart of the sort illustrated in FIG. 3.

Referring to FIG. 3, the chart shows four profile types for naturally-occurring ectasias: Central keratoconus, steep periphery; central keratoconus, flat periphery; decentred/low keratoconus; and pellucid marginal degeneration (PMD). A fifth profile type is presented for post surgical corneas. A typical corneal topographical image is provided for each profile type. For the four natural ectasia profile types, typical sample profiles are shown representing mild, moderate or advanced instances of the profile in question, with a normal corneal profile shown for comparison.

The corneal profile, as determined by examination with a slit lamp, gives important information about the overall corneal shape (in the vertical meridian), especially if the corneal topography is unavailable or difficult to interpret.

The corneal shape in natural ectasias is influenced by the location of the thinnest area of the cornea. The chart in FIG. 3 shows the characteristic shapes found in the four types and can be used, in conjunction with the chart shown in FIG. 2, to help allocate the cornea in question to a particular profile type.

Knowledge of the general type of the corneal profile is used, in the next step (6 in FIG. 1) to select a first choice fitting lens from a kit of test-fitting lenses. The particular embodiment described utilises a kit of test fitting lenses having the characteristics shown in the table in FIG. 4. The selection of most appropriate test fitting lens can be guided by reference to a chart, of the sort illustrated in FIG. 5.

Figure 4:
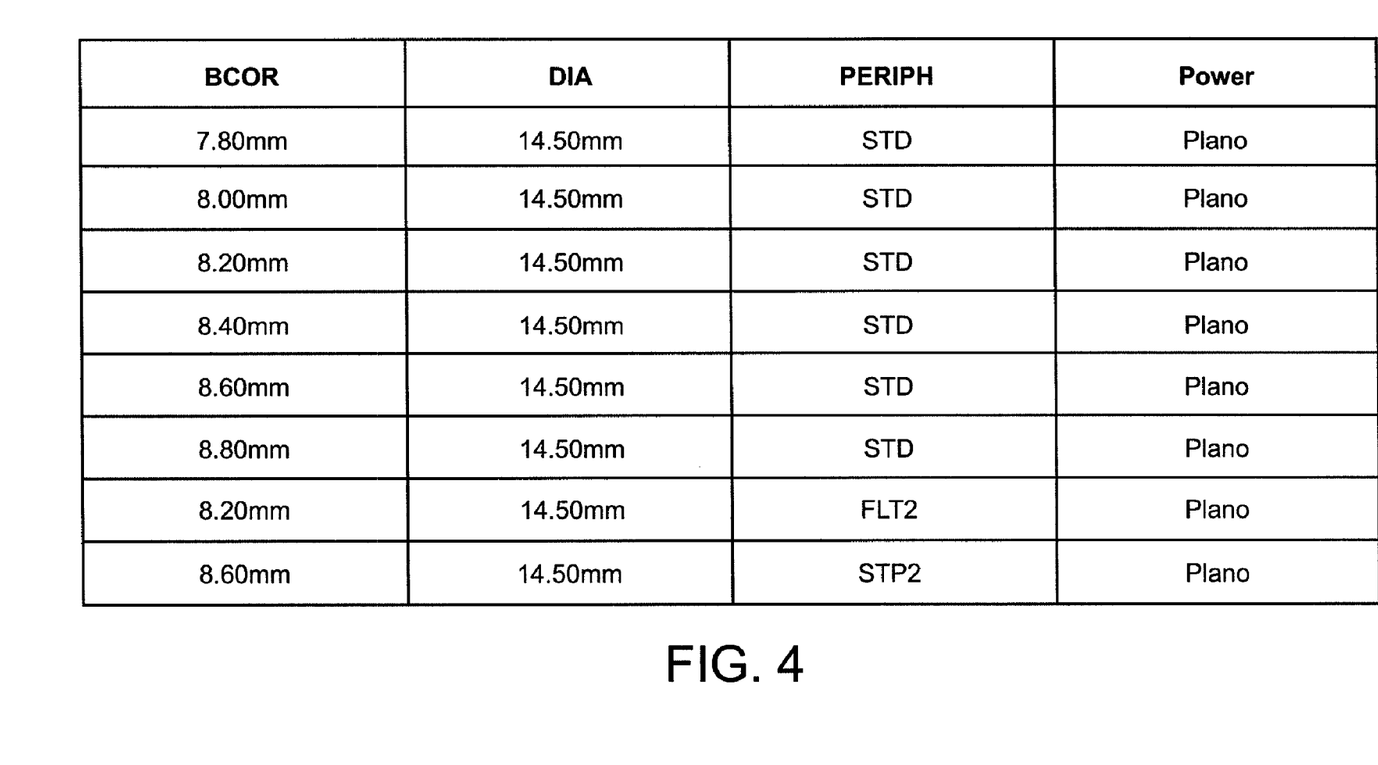
FIG. 4 shows a Table with the characteristics of a typical set of test fitting lenses for use in performing the method of the invention.

Referring to FIG. 4, the table shows some of the characteristics of the test lenses contained in a typical set of test fitting lenses to be used in performing the method of the invention. BCOR refers to the radius of curvature of the back surface of the lens over the central 8 mm diameter portion (the lenses are all 14.5 mm total diameter). "PERIPH" refers to the curvature applied to the periphery of the back surface of the lens (i.e. that part outside the central optic 8 mm diameter circle). The periphery may be "standard" (i.e. spherical base curve, having a defined periphery that provides the lens with an overall back sagittal depth predetermined to give best fit on the majority of irregular corneal eye shapes) or may be flattened by e.g. two increments ("FLT2"), i.e. having the same overall sagittal depth as a lens with a "standard" periphery but with a back surface radius of curvature that is flatter by 0.4 mm, or may be steepened by e.g. two increments ("STP2") i.e. having the same overall sagittal depth as a lens with a "standard" periphery but with a back surface radius of curvature that is steeper by 0.4 mm.

Figure 5:
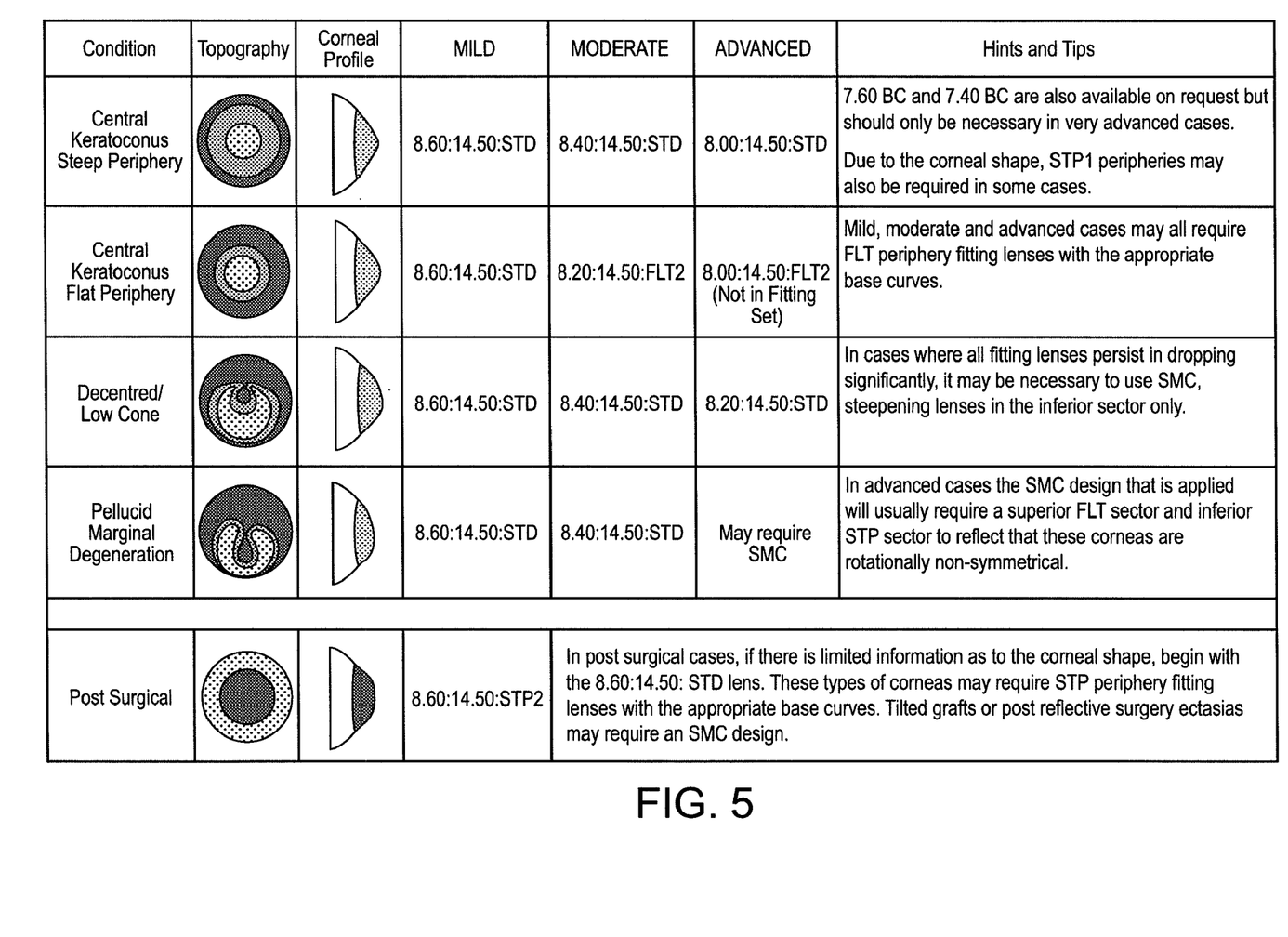
FIG. 5 shows a "First Choice Fitting Lens Guide" chart devised by the applicants for use in performing the method of the invention, relating determined corneal profile to a suggested first choice fitting lens selected from the set of test fitting lenses shown in FIG. 4.

FIG. 5 shows a "first choice fitting lens guide", which identifies four naturally occurring corneal profile types (these are the same as those identified in FIG. 3), and a post-surgical profile type. For each profile type, a suggested first choice test fitting lens is indicated (depending upon the severity of the irregularity: mild, moderate or severe), together with some further advice. This helps the practitioner select a good starting point for the test fitting process, using a first choice test fitting lens selected from e.g. the kit having the properties outlined in FIG. 4.

Once the selected test fitting lens has been placed on the eye of the subject, an assessment of the fit of the test lens is commenced within 5 minutes, preferably within 4 minutes, more preferably within 3 minutes, and most preferably within 2 minutes. This is illustrated schematically at (8) in FIG. 1.

The fit of the lens is assessed using the MoRoCCo and VA parameters, as described above. The assessment may conveniently be performed essentially as detailed in the chart shown in FIG. 7. The results of the assessment may be compared to a chart e.g. such as the "fit assessment guide" shown in FIG. 6, which guides practitioners as to what constitutes an acceptable fit for the lens, and what corrective action to take if one or more of the assessed parameters is sub-optimal.

Figure 7:
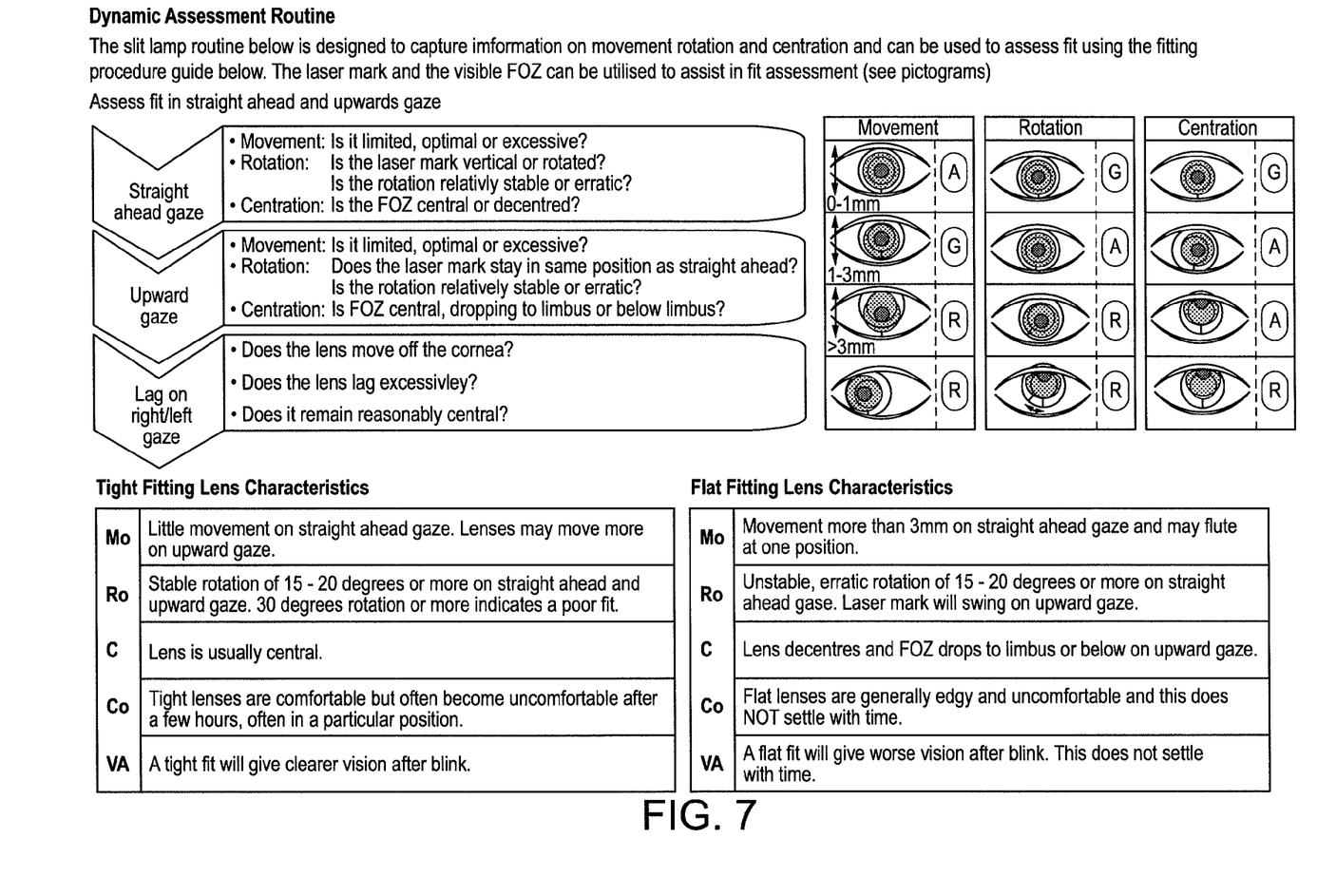
FIG. 7 shows a chart displaying information on how to perform the lens fit assessment and outlining the characteristics of tight- or flat-fitting lenses.

Referring first to FIG. 7, the chart outlines the steps to be performed in examining the behaviour of the lens on eye, using investigation with a slit lamp. The laser mark and the visible front optic zone (FOZ) can be used to help in the fit assessment. The routine is a "Dynamic Assessment Routine" (DAR) in which the behaviour of the lens is checked (in relation to its movement, rotation and centration) with the subject sequentially looking straight ahead, upwards, and to left and right. The pictograms illustrate behaviours of movement, rotation and centration which are acceptable ("G"—green on the chart shown in FIG. 6), sub-optimal ("A"—amber—on the chart shown in FIG. 6) or unacceptable ("R"—red on the chart shown in FIG. 6).

The bottom of the chart describes some of the properties of tight and flat fitting lenses in relation to the MoRoCCo and VA parameters used in the method of the invention.

Hints and Tips

Movement

A lens that is fitting too flat, may initially be mobile and then can become immobile after approximately 20 minutes due to the lens decentring and aligning with flatter areas of the cornea. However, the lens will usually move easily with Push-Up test. This is one reason why it is important to assess the fit within 5 minutes.

Lenses that are fitting tightly and show little movement on straight ahead gaze, may appear to move well on upward gaze due to lid interaction with the lens edge. Be guided, in this instance, by the movement on straight ahead gaze.

Rotation

For an irregular cornea, a significantly rotated lens indicates that the fit is not correct. It is desirable for the laser mark to be as vertical as possible.

A lens that is fitting tightly will produce a stable rotation; i.e. it will remain in approximately the same position when the patient looks straight ahead and then looks upward.

A lens that is fitting flat will demonstrate rotation that is unstable: i.e. it may change position over time and on upward gaze will swing back towards the vertical in an erratic fashion.

For some corneas, there will always be some rotation, whichever lens is fitted, in which case the optimal fit must be determined solely by the other characteristics.

Centration

The FOZ of the KeraSoft® IC lens can be used to judge centration and movement. A decentred lens that appears to be fitting well in all other respects will often induce ghosting and patients may report that they have improved acuity if they turn their head. This usually indicates the lens is fitting flat and visual symptoms are caused by the decentred optics.

On upwards gaze, if a lens drops so that the FOZ rests on the limbus or falls below it, this indicates a lens is fitting too flat. If the FOZ falls below the limbus, then try a lens 2 steps steeper. If all Fitting Lenses tend to show that the FOZ decentres downwards towards the limbus, this implies marked inferior curvature of the cornea, in which case an SMC design might be the appropriate option to use.

Significant lag on lateral gaze movements will confirm a lens is fitting too flat. If the lens moves significantly off the cornea, then try lens 2 steps steeper. For moderate lag, try 1 step steeper.

Comfort

This characteristic is very valuable in assessing fit.

A lens that is fitting flat will feel generally edge in the eye. Optimal and tight fits will both feel comfortable; however, a lens that is fitting tightly will gradually start to feel uncomfortable at the flattest point of the cornea and the patient will be able to indicate this area quite easily.

If patients have become accustomed to contact lenses that are uncomfortable, they may feel that a KeraSoft® IC Fitting Lens is comfortable, even if it is fitting too flat. However, they can still differentiate between lenses that are fitting steeper and flatter when given the option.

VA

Visual Acuity with a plano Fitting Lens, and an over refraction in place, is an excellent indicator of fit. This is why it is suggested that over refraction is started as soon as the fit is in the AMBER or GREEN zone.

Always ask the patient whether vision is better or worse after the blink. If Visual Acuity is clearer after the blink straight away, reassess the fit on slip lamp as the lens may be too tight. Use other indicators, such as rotation and movement, to assess whether to flatten lens by 1 or 2 steps.

If the Visual Acuity is worse after the blink, wait to see if this starts to improve with settling. If it does not, reassess the fit on slit lamp as the lens may be fitting too flat. Use other indicators, such as rotation and centration, to assess whether to flatten lens by 1 or 2 steps.

Significant ghosting of letters can indicate that the lens is decentred or that the cyl element is over, or under, corrected. If retinoscopy is difficult, due to corneal distortion, autorefraction or topography over the lens can be helpful in indicating amount of cyl and its axis.

Referring now to FIG. 6, the fit assessment guide chart summarises characteristics of the lens under the MoRoCCo and VA parameters for a lens with a good fit (Green), a sub-optimal fit (Amber) and a poor fit (Red) and, in the latter two instances, suggests appropriate corrective action.

Indicators that a lens is in the "Red" zone include: fluting or air bubbles that do not settle, and significant rotation.

Care should be taken to differentiate between a mobile tight fit and an immobile flat fit. Mobile tight lenses will move excessively, immediately upon insertion, and may trap bubbles under the lens. They will tend to stay mobile during settling. In contrast, immobile flat lenses will be very mobile initially but will become decentred and immobile on settling.

The fit assessment is preferably commenced within 5 minutes of placing the test lens on eye. If one of the MoRoCCo parameters is in the red zone, the test lens should be removed and an alternative test lens used which has 1 or 2 steps steeper or flatter curvature. If the fit is in the green or amber zone, the necessary over-refraction to correct vision can be investigated whilst the lend settles further. If the VA is in the red zone, the lens should be removed and an alternative test lens considered. If however the VA is in the amber zone, it should be ascertained if the fit is too steep or too flat, and then adjusted by one increment.

When an optimal 'green' fit is obtained, the lens should be allowed to settle for 15-20 minutes before finally determining the necessary over-refraction, and noting the back vertex distance (BVD).

Thus, if one or more of the measured parameters gives an unacceptable result (10 in FIG. 1), then an alternative test lens, with different back surface characteristics, is selected. This is placed on the eye of the subject and, again ideally within 5 minutes, the fit of the alternative test lens is assessed (12 in FIG. 1), using the same MoRoCCo and VA parameters. This process loop can be repeated as many times as necessary until all the measured parameters are acceptable.

Referring to FIG. 1, if all the parameters are acceptable using the first choice test lens, or after one or more further iterations of the trial-and-error loop (10, 12) to arrive at an appropriately fitting lens (14), any desired corrective over-refraction or optical power is applied to the lens, and a lens with the necessary shape can then be ordered and manufactured for the subject (16).

If all the assessed fit parameters are acceptable, but perhaps the practitioner believes the fit of the lens is sub-optimal, the optional sub-routine (18) can be utilised, in which the curvature of one or more portions of the periphery of the back surface of the lens can be adjusted to improve the fit. The optional nature of this part of the method is denoted by dotted lines, but it would be usual for at least of the fit parameters to be sub-optimal. The periphery of the back surface can be steepened or flattened in its entirety, or selected sector of the periphery may be steepened or flattened ("Sector Management Control"), with smoothed blending of the curvature between the selected sectors.

Example 2

Subject with Central Keratoconus

Identifying Corneal Shape
Spectacle Rx+0.25/−2.75×103 VA 6/15
Sim Ks: 7.32/6.78
Steepest curvature (Inferior): 6.34 mm radius
Flattest curvature: 7.93 mm radius
Curvature of "green area" on topography: 7.30
Corneal Astigmatistm: −4.98×141@ 3 mm
−3.48×143 @ 5 mm
Corneal Shape Recognition Chart This cornea demonstrated reasonably normal K readings with a low spectacle Rx but with the central acuity affected significantly. This is typical of mild central ectasias, as any distortion on the visual axis impacts on VA.

The corneal topography, analysed using a corneal topographer instrument, had a pattern reminiscent of low cones/ PMD but the central location of a steep area confirmed keratoconus. The curvature of the "green" area and the flattest curvature value showed that this cornea had a relatively steep periphery.

First Choice Lens

Even though this was a case of mild keratoconus, the cornea had a relatively steep overall profile. The suggested First Choice lenses for this type of cornea are 8.00/STD and 7.80/ STD. Therefore the first lens tried in eye was the 8.00/STD Fitting Lens. i.e. a lens with an 8.00 mm radius of curvature for the back surface, and a standard (i.e. spherical) curve applied to the periphery of the near surface)

| | |
|---|---|
| Movement: | 3 mm+ Movement post blink |
| Rotation: | 10 CW unstable |
| Centration: | Centred but drops to limbus on upward gaze |
| Comfort: | Comfortable |
| VA: | OR Plano/−2.50 × 135 VA 6.7.5+ stable after the blink |
| Conclusion: | This lens is behaving adequately but not optimally |
| Action: | This lens was removed and a 7.80/STD inserted |

MoRoCCo findings for 7.80/STD Lens assessed within the first 5 minutes

| | |
|---|---|
| Movement: | 2 mm post blink movement |
| Rotation: | Vertical |
| Centration: | Centred on straight ahead and upward gaze |
| Comfort: | Uncomfortable—felt "tight" |
| VA: | VA slightly clearer after the blink with same over refraction |
| Conclusion: | This lens gives good peripheral fit but is tight centrally |
| Action: | Order lens with 8.00 base curve and STP1 peripheral fit |

| | |
|---|---|
| Movement: | 2 mm |
| Rotation: | Vertical |
| Centration: | Centred on straight ahead and upward gaze |
| Comfort: | Comfortable |
| VA: | VA 6/7.5+ |
| Discussion: | Steepening the periphery should not be used automatically to tighten a fit. Always try the next steepest base curve from the Fitting Set first and only resort to peripheral |

-continued changes if no single lens gives good fit and vision and
optimal fit characteristics are found with more than one
base curve.

Example 3

Subject with Decentred Cone

History

Subject diagnosed with keratoconus 14 years previously and had worn RGP lenses since. (VA this eye 6/12). The cornea had central scarring and significant staining with fluoresein. Due to the current discomfort, the patient elected to go without a lens until the cornea had demoulded.

Identifying Corneal Shape

Spectacle Rx: +1.25/−6.25×50 VA 6/15

Sim Ks: 6.13/5.39

Steepest curvature: 4.75 mm radius

Flattest curvature: 9.30 mm radius

Curvature of "green area" on topography: 7.50

Corneal Astigmatism: −7.58 D ax 11 at 3 mm

−6.56 D ax 41 at 5 mm

Corneal Shape Recognition Chart

In this case, the spectacle refraction had been affected by central scarring and thus the normal relationship between refraction and corneal shape had been changed. Decentred cones often demonstrate oblique axes, which can be a useful clue if topography is not available. This cornea demonstrated a very flat periphery on topography but this may not, in fact, mean the corneal-scleral junction is flat.

First Choice Lens

For decentred cones, the suggested choices are: 8.20 or 8.40 STD. As there were significant flat areas on this cornea, the 8.40/STD lens was tried first.

MoRoCCo findings for the 8.40/STD lens—assessed within the first 5 minutes

| | |
|---|---|
| Movement: | 3 mm post blink movement |
| Rotation: | 15 degrees anticlockwise |
| Centration: | Lens was decentred 2 mm nasally and dropped to limbus on upward gaze |
| Comfort: | Lens felt edgy |
| VA: | Over Rx is +1.00/−6.00 × 60 6/12 with ghosting. VA worse after the blink |
| Conclusion: | Lens was fitting flat |
| Action: | This lens was removed and the 8.20/STD inserted |

MoRoCCo findings for the 8.20/STD lens—assessed within the first 5 minutes

| | |
|---|---|
| Movement: | 3 mm post blink movement |
| Rotation: | 5 degrees anticlockwise, unstable rotation, especially on upward gaze |
| Centration: | Lens was decentred 0.5 mm nasally and dropped to limbus on upward gaze |
| Comfort: | Comfortable |
| VA: | With same over refraction, VA was 6/9+ still slightly worse after the blink |
| Conclusion: | This lens was still fitting slightly flat |
| Action: | This lens was removed and the 8.00/STD inserted |

MoRoCCo findings for the 8.00/STD lens—assessed within the first 5 minutes

| | |
|---|---|
| Movement: | 1-2 mm post blink movement |
| Rotation: | Vertical |
| Centration: | Centred |
| Comfort: | Comfortable |
| VA: | With same over refraction, VA was 6/7.5+ stable before and after the blink |
| Conclusion: | Lens had all parameters in optimal range from Fit Assessment Chart |
| Action: | This lens was now optimal and was ordered |

Discussion

The flattest and steepest areas on a topography can be very misleading, therefore it is always wise to look at the corneal profile and also start fitting with STD lenses from the Fitting Set rather than order flatter Fitting Lenses Remember one is fitting the whole cornea, not just the steepest area. In this case, it might have been tempting to go straight to the 7.80 lens. If this had been done, the following MoRoCCo characteristics would have been found:

| | |
|---|---|
| Movement: | 1 mm post blink movement |
| Rotation: | Vertical |
| Centration: | Centred with no drop on upward gaze |
| Comfort: | Comfortable |
| VA: | 6/9 and slightly clearer after the blink |

If this had been the only lens tried, then it may well have been tempting to order this lens, thus missing the opportunity of better VA with the 8.00/STD lens.

Example 4

Subject with Low Cone

History

Subject diagnosed with Pellucid Marginal Degeneration 4 years previously and had a Corneal Collagen Cross linking (CXL) procedure 6 months previously. He had not used his RGP lenses since then and now wished to be refitted into soft lenses.

Identifying Corneal Shape

Spectacle Rx: +1.50/−8.00×120 VA 6/19

Sim Ks: 6.55/5.68

Steepest curvature (Inf): 6.61 mm radius

Flattest curvature: 8.80 mm radius

Curvature of "green area" on topography: 7.00

Corneal Astigmatism: −7.81×128 @ 3 mm

−6.80×131 @ 5 mm

Corneal Shape Recognition Chart

Although the topography map showed a classical PMD "crabs claw" pattern and the Spectacle Acuity also indicated this condition, in this case, the steepest area of curvature was relatively high and was thus better described as a low cone. A "Low cone" condition was also suggested from the central K readings and the poor Spectacle Acuity, which was caused by the rapid changes of curvature within the pupil area. It is often difficult to distinguish between low Cones and PMD and the fitting indications are often quite similar. Observing the Corneal Profile will often confirm the position of the steepest area.

First Choice Lens

Deciding on the first choice lens for Low Cones/PMD is challenging as often there are extremes of flatness and steepness within the same cornea. The suggested first choice for a Low Cone is either 8.40 or 8.60 STD and for PMD is 8.20/STD. This is influenced by the fact the lens had to fit the steeply curved inferior area. In this case, as the cornea had characteristics of both conditions, it was decided to start with the 8.40/STD lens.

MoRoCCo findings for 8.40/STD Lens assessed within the first 5 minutes

| | |
|---|---|
| Movement: | 1 mm post blink |
| Rotation: | Vertical but rotated clockwise and then anticlockwise on blinking and upward gaze |
| Centration: | Centred but dropped towards limbus on upward gaze |
| Comfort: | Initially good but patient began to feel the lens superiorly |
| VA: | 6/15-6/12 Variable and clearer after the blink and letters ghosted |
| Conclusion: | Lens is showing a mixture of tight and flat characteristics |
| Action: | Explored the fit of base curves either side of the 8.40/STD |

MoRoCCo finding for 8.20/STD Lens assessed within the first 5 minutes

| | |
|---|---|
| Movement: | Very little movement |
| Rotation: | Vertical and stable on straight ahead and upward gaze |
| Centration: | Centred |
| Comfort: | Uncomfortable at top edge of lens |
| VA: | 6/19+ Variable and clearer after the blink |

MoRoCCo findings for 8.60/STD Lens assessed within the first 5 minutes

| | |
|---|---|
| Movement: | 2 mm post blink movement |
| Rotation: | 10 degrees Anti clockwise and very unstable |
| Centration: | Sat low on straight ahead gaze and dropped to limbus on upwards gaze |
| Comfort: | Could feel lens at bottom edge |
| VA: | 6/9 but still ghosted |
| Conclusion: | This cornea would benefit from a Sector Management Control (SMC) lens. The best VA was with the 8.60 base curve but the lens was unstable at the bottom. The least rotation was with the 8.20 base curve but the lens was tight at the top. A lens was designed combining the fits of these two lenses. |
| Action: | An SMC plano trial lens was ordered with parameters: 8.60/STD/STP2 (each step is equivalent to a change in base curve of 0.20). The classic SMC design was used: A1:30 A2:150 A3:220 A4:320 |

MoRoCCo findings for 8.60/STD/STP2 Lens assessed within the first 5 minutes

| | |
|---|---|
| Movement: | 2 mm post blink movement |
| Rotation: | Vertical and stable on straight ahead and upward gaze |
| Centration: | Centred |
| Comfort: | Comfortable |
| VA: | 6/7.5 with +1.00/−9.00 × 125 over refraction. Stable before and after the blink and no ghosting |
| Discussion: | The poor acuity with STD lenses was due to tear pooling under the lens, either because steeper lenses were too tight or flatter lenses were to loose in different locations. By using a relatively flat base curve and then "tucking in" the inferior periphery, the best of both lens fits was obtained. The classic SMC can work well even if the steepest area of the cornea is decentred, as in this case. This is because the periphery of the lens is fitting to the sclera rather than to the cornea and the aim is to make sure the lens touches down properly inferiorly. The exception to this general rule is when fitting post grant corneas with tilted grafts or horizontally decentred cones. If required, extra Fitting Lenses incorporating SMC can be ordered to extend the STD set. |

The invention claimed is:

1. A method of determining an appropriately shaped soft contact lens for a subject with an irregular cornea, the method comprising the steps of:
   (a) inferring or deducing the profile of the cornea, using information obtained from at least one analytical technique, which information allows inferences or deductions to be made regarding the corneal profile over at least a portion thereof;
   (b) selecting a first choice fitting lens, the selection being based on the profile of the cornea obtained in step (a), and placing the selected lens on the subject's cornea;
   (c) assessing the fit of the contact lens to the cornea, by investigating each of the following parameters;
      (i) translational movement of the lens on eye;
      (ii) rotation of the lens on eye;
      (iii) centration of the lens on eye;
      (iv) the perceived comfort of the lens for the subject;
      (v) the visual acuity of the subject when wearing the lens; and
   (d) adjusting the fitting lens, if required, according to the assessment performed in step (c) and reiterating the step (c) assessment using the adjusted fitting lens until a desired fit of lens to the cornea has been obtained; and, optionally,
   (e) adjusting the periphery of the lens to obtain a desired fit to the cornea at the periphery thereof.

2. The method according to claim 1, wherein the at least one analytical technique in step (a) comprises; corneal topographical analysis using a corneal topographer instrument or examination of the subject with a slit lamp and/or central K readings.

3. The method according to claim 1, wherein step (a) comprises allocating the profile of the subject's cornea to one of a plurality of pre-determined profile types.

4. The method according to claim 3, wherein the plurality of pre-determined types include:
   (i) central keratoconus, steep periphery;
   (ii) central keratoconus, flat periphery;
   (iii) decentred keratoconus;
   (iv) pellucid marginal degeneration; and
   (v) post-surgical/grafted corneas.

5. The method according to claim 3, wherein step (b) is based on the determined profile type of the subject's cornea.

6. The method according to claim 1, wherein step (c) is initiated within 5 minutes of placing the test lens on the subject's cornea.

7. The method according to claim 6, wherein step (c) is initiated within 4 minutes of placing the test lens on the subject's cornea.

8. The method according to claim 6, wherein step (c) is initiated within 3 minutes of placing the test lens on the subject's cornea.

9. The method according to claim 1, wherein parameters (i)-(v) in step (c) are all given equal or approximately equal weighting.

10. The method according to claim 1, in which parameters (i)-(iv) are assessed with the subject looking straight ahead, and with the subject gazing upward, and with the subject looking to right and left.

11. The method according to claim 1, wherein step (c) is performed with reference to a guidance chart.

12. A method of making a soft contact lens for a subject, the method comprising the steps of:
determining an appropriately shaped soft contact lens for the subject using the method of claim 1, and causing a contact lens to be manufactured with the determined shape.

13. A kit for use in performing the method of claim 1, the kit comprising: a set of test soft contact lenses, the set comprising a plurality of lenses each having a different respective radius of curvature over a central portion of their rear surface; and a fit assessment guide, providing information on how to perform the method of claim 1.

14. The kit according to claim 13, wherein the set of test lenses comprises a plurality of plano lenses having zero optical power.

15. The kit according to claim 13, wherein the set of test lenses comprises a plurality of lenses having the same diameter.

16. The kit according to claim 13, wherein the set of test lenses comprises a plurality of lenses, forming the majority of the lenses in the set, which have an identical curvature on the periphery of the back surface, and wherein there is at least one lens with a peripheral back surface more steeply curved than the majority and at least one lens with a peripheral back surface less steeply curved than the majority.

17. The kit according to claim 13, wherein the fit assessment guide comprises a printed publication, a CD-ROM, a DVD or an online tutorial.

* * * * *